US012709048B2

(12) United States Patent
Wu et al.

(10) Patent No.: US 12,709,048 B2
(45) Date of Patent: Aug. 18, 2026

(54) INJECTION MOLD AND INJECTION MOLDING METHOD

(71) Applicant: HUAWEI TECHNOLOGIES CO., LTD., Guangdong (CN)

(72) Inventors: Fankun Wu, Shanghai (CN); Zhen Lv, Shanghai (CN); Zhaozheng Hou, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 273 days.

(21) Appl. No.: 18/183,988

(22) Filed: Mar. 15, 2023

(65) Prior Publication Data

US 2023/0219269 A1 Jul. 13, 2023

Related U.S. Application Data

(63) Continuation of application No. PCT/CN2020/115561, filed on Sep. 16, 2020.

(51) Int. Cl.
*B29C 45/36* (2006.01)
*B29C 45/14* (2006.01)
(Continued)

(52) U.S. Cl.
CPC ........ *B29C 45/36* (2013.01); *B29C 45/14065* (2013.01); *B29C 45/2608* (2013.01);
(Continued)

(58) Field of Classification Search
CPC .................... B29C 45/36; B29C 45/28; B29C 2045/14147
See application file for complete search history.

(56) References Cited

U.S. PATENT DOCUMENTS 3,972,663 A 8/1976 Taniguchi
4,861,251 A 8/1989 Moitzger
(Continued)

FOREIGN PATENT DOCUMENTS

CN 202473866 U 10/2012
CN 203739124 U 7/2014
(Continued)

OTHER PUBLICATIONS

Extended European Search Report issued in EP20953578.0, dated Sep. 21, 2023, 7 pages.
(Continued)

*Primary Examiner* — Virak Nguon

(57) ABSTRACT

An injection mold and an injection molding method are provided. The injection mold includes a housing and a cover. The housing is provided with a mold cavity. The mold cavity is configured to accommodate a power module. The cover is provided with a plurality of vias. The cover is detachably connected to the housing. The cover is located in the mold cavity and locates the power module jointly with the housing. The plurality of vias is configured to match a plurality of pins of the power module. In the present disclosure, the cover is disposed, and the cover is provided with the vias for pins to pass through. By using covers with different arrangement manners of vias, a same set of injection molds can be compatible with power modules of a same series that have different locations of pins. Arrangement manners of vias on different covers are different.

15 Claims, 5 Drawing Sheets

(51) Int. Cl.
*B29C 45/26* (2006.01)
*B29C 45/28* (2006.01)
*B29L 31/34* (2006.01)

(52) U.S. Cl.
CPC .... *B29C 45/28* (2013.01); *B29C 2045/14147* (2013.01); *B29L 2031/34* (2013.01)

(56) References Cited

U.S. PATENT DOCUMENTS

| | | | | |
|---|---|---|---|---|
| 4,935,581 | A | 6/1990 | Komathu | |
| 5,652,463 | A * | 7/1997 | Weber | H10W 74/016 257/667 |
| 2008/0296796 | A1 | 12/2008 | Watanabe et al. | |
| 2011/0169191 | A1 | 7/2011 | Geise | |
| 2012/0287582 | A1 | 11/2012 | Vinciarelli et al. | |
| 2022/0013371 | A1 * | 1/2022 | Müller | B29C 45/14418 |

FOREIGN PATENT DOCUMENTS

| | | | | |
|---|---|---|---|---|
| CN | 104441486 | A | 3/2015 | |
| CN | 107116746 | A | 9/2017 | |
| CN | 208615205 | U | 3/2019 | |
| CN | 109940834 | A | 6/2019 | |
| CN | 209409169 | U | 9/2019 | |
| CN | 110466114 | A | 11/2019 | |
| CN | 110965508 | A | 4/2020 | |
| CN | 210308719 | U | 4/2020 | |
| CN | 210676749 | U | 6/2020 | |
| CN | 111527598 | A * | 8/2020 | H10W 40/228 |
| CN | 211428140 | U | 9/2020 | |
| DE | 102018219005 | A1 | 5/2020 | |
| JP | H06134811 | A | 5/1994 | |
| JP | 2001018252 | A | 1/2001 | |
| JP | 2014054009 | A | 3/2014 | |
| JP | 2019119093 | A | 7/2019 | |

OTHER PUBLICATIONS

International Search Report and Written Opinion issued in PCT/CN2020/115561, dated Jun. 11, 2021, 10 pages.

Office Action issued in CN202080012415.4, dated Oct. 8, 2022, 13 pages.

Notice of Allowance issued in CN202080012415.4, dated May 26, 2023, 4 pages.

* cited by examiner

INJECTION MOLD AND INJECTION MOLDING METHOD

CROSS-REFERENCE TO RELATED APPLICATIONS

This application is a continuation of International Application No. PCT/CN2020/115561, filed on Sep. 16, 2020, the disclosure of which is hereby incorporated by reference in its entirety.

TECHNICAL FIELD

The present disclosure relates to the field of packaging technologies, and in particular, to an injection mold and an injection molding method.

BACKGROUND

A power module is a module obtained by combining and packaging electronic power devices based on specific functions, and is widely used in the fields of servo motors, frequency converters, inverters, and the like.

The power module is provided with a pin, thereby facilitating quick crimping or welding at a system end. In a process of packaging the power module, the pin passes through an injection mold. When a location of the pin changes, the entire injection mold needs to be replaced, to allow pins of different power modules to pass through. This is not conducive to a design change or development of a new power module of a same series. A development cycle of an injection mold is long, and costs are high.

How to make a same set of injection molds compatible with power modules of a same series that have different locations of pins should be a research and development direction of the industry.

SUMMARY

The present disclosure provides an injection mold and an injection molding method, so that a same set of injection molds can be compatible with power modules of a same series that have different locations of pins, thereby facilitating a design change in a power module development process and development of a new power module of a same series.

According to a first aspect, the present disclosure provides an injection mold, including a housing and a cover. The housing is provided with a mold cavity. The mold cavity is configured to accommodate a power module. The cover is provided with a plurality of vias. The cover is detachably connected to the housing. The cover is located in the mold cavity and locates the power module jointly with the housing. The plurality of vias is configured to match a plurality of pins of the power module.

In the present disclosure, the cover is disposed, and the cover is provided with the vias for pins to pass through. By replacing covers with different arrangement manners of vias, a same set of injection molds can be compatible with power modules of a same series that have different locations of pins. Specifically, the housing includes a first housing and a second housing, the first housing is provided with a first cavity, the second housing is provided with a second cavity (the first cavity and the second cavity form the mold cavity), the first housing and the second housing are fastened to a device or a mold base, the power module is placed in the second cavity, the cover fits with the power module so that the pins of the power module pass through the vias, and then the first housing, the cover, the power module, and the second housing are in a press-fit to implement injection sealing. Arrangement manners of locations of vias on different covers are different. When injection molding is performed on power modules with different arrangement manners of pins, injection sealing can be implemented only through replacement with a cover provided with corresponding vias, without replacing the entire injection mold, thereby improving utilization of the first housing and the second housing, and resolving problems of a long development cycle and high costs of the injection mold. In addition, this can greatly reduce workload during switching between power modules of a same series in a production line, thereby improving efficiency of the production line.

According to a second aspect, the present disclosure provides an injection mold, including: a housing, provided with a mold cavity, where the mold cavity is configured to accommodate a power module; at least two covers, where each cover is provided with a plurality of vias, and arrangement manners of vias on different covers are different, to match a plurality of pins of power modules of different models. The housing selectively fits with one of the plurality of covers to jointly locate the power module.

In the present disclosure, a set of injection molds may include one housing (that is, one first housing and one second housing) and at least two covers. It may be understood that the at least two covers include a first cover and a second cover (there may be a plurality of first covers and a plurality of second covers). The first cover is provided with a plurality of first vias, and the second cover is provided with a plurality of second vias. An arrangement manner of the first vias on the first cover is different from an arrangement manner of the second vias on the second cover. Both the first cover and the second cover can be detachably connected in the mold cavity. The plurality of first vias and the plurality of second vias are configured to allow pins of power modules of different models to pass through.

In a possible implementation, the injection mold further includes an elastic connection structure, and the elastic connection structure is connected to the cover, to implement an elastic connection between the cover and the housing. Specifically, one end of the elastic connection structure is connected to the cover, and the other end of the elastic connection structure is detachably connected to the inside of the housing. The housing compresses the elastic connection structure, and the elastic connection structure applies elastic pressure to the cover, so that the cover and the power module are in a press-fit.

In a possible implementation, the elastic connection structure includes a support rod and an elastic part, the support rod is elastically connected to the cover by using the elastic part, and the support rod is in contact with an inner surface of the housing. The elastic part may be a spring or the like. When the elastic part is compressed, the elastic part applies pressure to the cover, so that the cover presses against a board body of the power module, thereby preventing the board body of the power module from being damaged due to injection pressure.

In a possible implementation, the cover includes a first surface and a second surface that are opposite to each other, the via penetrates the first surface and the second surface, the support rod includes a first cylinder and a second cylinder, the first cylinder is located on a side of the first surface of the cover, the second cylinder includes a limiting part and a connecting part, the cover is provided with a limiting hole, the limiting part is located in the limiting hole and fits with a limiting structure in the limiting hole to prevent the limiting part from moving out of the cover from the side of the first surface, the connecting part extends out of the limiting hole and is fastened to the first cylinder, and the elastic part is sleeved on the connecting part and is elastically held between the first surface and the first cylinder. During molding, the first housing is in contact with the support rod and applies pressure to the support rod. The support rod has a scalable structure, and the support rod drives the elastic part to be compressed, so that the cover is tightly attached to the board body of the power module, and then injection molding is performed. The support rod and the elastic part may be integrated with the cover under the condition of ensuring processing precision. It may be understood that the support rod and the elastic part constitute a scalable elastic connection structure, and the elastic connection structure is configured to apply pressure to the cover to press against the power module. The elastic connection structure is not limited to the form of fitting between the support rod and the elastic part, and may be alternatively another elastic connection structure.

In a possible implementation, the housing includes a first housing and a second housing, the first housing is provided with a first cavity, the first cavity includes a first sub-cavity and a second sub-cavity, a stepped surface is formed at a joint between the first sub-cavity and the second sub-cavity, the second housing comprises a second cavity, the first housing and the second housing are snap-fitted so that the second cavity is connected to the first cavity, the cover is located in the first sub-cavity, a part of the power module is located in the second cavity, and a part of the power module is located in the second sub-cavity and is in contact with the stepped surface. In an injection molding process, gel is injected into the second sub-cavity and the second cavity, and a part of the power module is in contact with the stepped surface to prevent the gel from overflowing to the first sub-cavity and adhering to the pins extending into the first sub-cavity. Specifically, a size of the board body of the power module is greater than a size of the first sub-cavity. In a molding process, the first housing presses against the board body, that is, the board body is in contact with the stepped surface.

It may be understood that a size and a shape of a first cavity of a same set of injection molds need to be set based on locations and sizes of pins of power modules of a same series. The first sub-cavity has a hollowed-out structure, and a pin extends into the first sub-cavity through a via, thereby facilitating cleaning when gel overflows. Specifically, when gel overflows to the first sub-cavity and adheres to an inner wall of the first sub-cavity, the first housing may be separated from the second housing, and the hollowed-out first sub-cavity is separately cleaned.

In a possible implementation, a quantity of vias of each cover is greater than or equal to a quantity of pins of the power module, and an arrangement manner of vias of each cover matches a plurality of pins of at least one power module. When a quantity of vias of a cover is equal to a quantity of pins of a matching power module, that is, the vias are in a one-to-one correspondence with the pins, gel can be prevented from overflowing through excessive vias in which no pins are inserted. In this way, one cover corresponds to one type of power module, and another cover needs to be used when another power module with different locations of pins appears. When a sealing effect between the board body of the power module and the first housing is good and gel does not overflow to the cover, a quantity of vias of each cover may be alternatively set to be greater than a quantity of pins of a power module. In this way, a same cover can be compatible with at least two power modules with different locations of pins, thereby resolving problems of a long development cycle and high costs of the injection mold. In addition, this can greatly reduce workload during switching between power modules of a same series in a production line, thereby improving efficiency of the production line.

In a possible implementation, the via includes a first section and a second section, a limiting surface is formed between the first section and the second section, the pin includes a body part and a fixed part that protrudes from a periphery of the body part, a stepped surface is formed at a joint between the body part and the fixed part, the first section is configured to accommodate the body part, the second section is configured to accommodate the fixed part, and the stepped surface is in contact with the limiting surface to implement a sealed connection between the cover and the pin. The sealed connection between the cover and the pin can prevent injection molding gel from overflowing to the first sub-cavity through a gap between an inner wall of the via and the pin during injection molding. A specific structure of the pin includes but is not limited to a cylindrical pin, a regular polygonal pin, a flat pin, and an irregular pin. When the specific structure of the pin is changed, a shape of the via is also changed correspondingly.

In a possible implementation, the cover includes a first surface and a second surface that are opposite to each other, the via penetrates the first surface and the second surface, a sealing pad is disposed on the second surface, and the sealing pad is disposed at a periphery of the via, and/or the sealing pad is disposed on the limiting surface of the via. The sealing pad can implement tighter sealing between the pin and the cover, to prevent injection molding gel from overflowing to the first sub-cavity through a gap between an inner wall of the via and the pin during injection molding.

In a possible implementation, the cover includes a first surface and a second surface that are opposite to each other, the via penetrates the first surface and the second surface, a limiting block is disposed on the second surface of the cover, the power module is provided with a limiting hole, and the limiting block is embedded into the limiting hole to limit locations of the cover assembly and the power module. In other words, the cover and the power module are located and fastened through a detachable connection by using the limiting block and the limiting hole.

In a possible implementation, the power module is fastened to a support, and the support is bonded to an edge of the housing, to limit a location of the power module in the mold cavity. It may be understood that the power module may be alternatively located by using another structure. For example, a locating part is disposed on a circuit board of the power module, the housing is provided with a locating hole, and the locating part is embedded into the locating hole to locate the power module on the housing.

It may be understood that a plurality of mounting areas may be provided on the support at intervals (the mounting areas are hollow areas on the support, and power modules are fastened to the mounting areas). There may be two, three, four, five, or more mounting areas on each support. In other words, a plurality of power modules may be disposed on each support at intervals. In a molding process, one injection mold corresponds to one power module. In this way, injection sealing can be simultaneously performed on a plurality of power modules, thereby improving packaging efficiency of a production line.

In a possible implementation, the cover is made of one or more of a titanium alloy, a copper alloy, or stainless steel. The cover is usually characterized by a small thermal expansion coefficient, high temperature resistance, and high strength. The cover is made of one or more of a titanium alloy, a copper alloy, stainless steel, and the like. A cover made of a titanium alloy, a copper alloy, or stainless steel has a small thermal expansion coefficient and a light weight, thereby facilitating mounting during molding, detaching during demolding, and replacement of the cover.

In a possible implementation, there is a plurality of support rods, and the plurality of support rods is symmetrically distributed on the first surface. There may be a plurality of support rods, and the plurality of support rods is symmetrically and uniformly distributed on the cover. This can ensure that the entire cover is subject to uniform pressure during compression, to press against the power module, and can prevent the cover from being subject to a non-uniform force, which causes loose compression between the cover and a part of the board body of the power module, and causes damage to a part of the board body of the power module due to injection pressure.

According to a third aspect, the present disclosure provides an injection molding method: providing an injection mold, where the injection mold includes a housing and at least two covers, the housing is provided with a mold cavity, each cover is provided with a plurality of vias, and arrangement manners of vias on different covers are different; selecting one of the covers based on a distribution status of pins of a to-be-injection-molded power module, where an arrangement manner of vias on the cover matches an arrangement manner of pins of the power module; placing the to-be-injection-molded power module in the mold cavity; and mounting the cover to the to-be-injection-molded power module, so that the pins pass through the vias.

Specifically, after the cover is mounted, a first housing and a second housing are connected to form the housing. The housing surrounds the cover and the power module. A gel injection opening is provided on the housing, and is used for injecting gel (the gel may be silicone, silicon gel, resin, or the like) into a second sub-cavity and a second cavity, to completely seal the power module through injection molding, and provide insulation protection and dust prevention for the power module. In a demolding process, the first housing is separated from the second housing, a support rod and an elastic part are restored to an uncompressed state, and the cover and the injection-molded power module are taken out.

The injection mold in the present disclosure has a simple structure. By replacing covers with different arrangement manners of vias, a same set of injection molds can be compatible with power modules of a same series that have different locations of pins, thereby improving utilization of the housing (the first housing and the second housing), and resolving problems of a long development cycle and high costs of the injection mold. In addition, this can greatly reduce workload during switching between power modules of a same series in a production line, thereby improving efficiency of the production line.

BRIEF DESCRIPTION OF DRAWINGS

The following describes accompanying drawings used in embodiments of the present disclosure.

DESCRIPTION OF EMBODIMENTS

The following describes embodiments of the present disclosure with reference to accompanying drawings in embodiments of the present disclosure.

The present disclosure provides an injection mold and an injection molding method. The injection mold is mainly used to package a power module. The power module is a module obtained by combining and packaging electronic power devices based on specific functions, and has advantages of high current density, a low saturation voltage, high voltage resistance, high input impedance, a high switching frequency, and a low driving power. In addition, the power module integrates logic, control, detection, and protection circuits, thereby reducing a system size and development time, and also greatly enhancing system reliability. The power module is easy to use, adapts to a current modularization and integration-oriented development direction of power devices, and is widely used in the fields of servo motors, frequency converters, inverters, and the like. To maintain operation stability of the power module, the power module is usually packaged by using synthetic resin, to improve insulation and protection, and prevent the power module from being affected by an environment.

Figure 1:
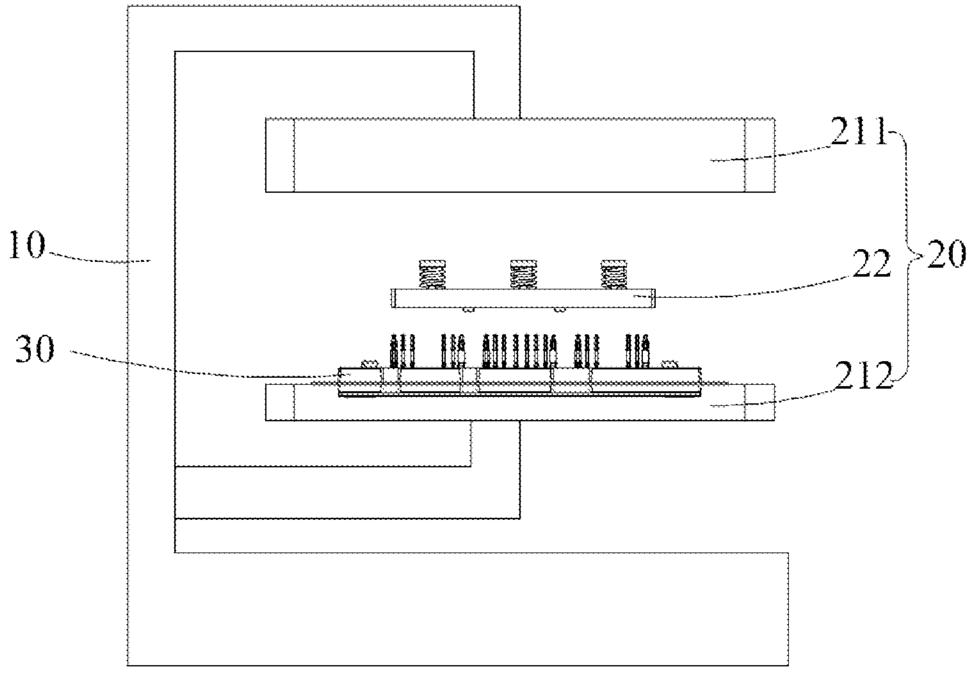
FIG. 1 is a schematic diagram of packaging a power module by using an injection mold according to an embodiment of the present disclosure.

FIG. 1 is a schematic diagram of packaging a power module by using an injection mold. The injection mold 20 is fastened to a device 10 (the device 10 may be a plastic packaging machine). In a molding process, the device 10 operates to package the power module 30 into the injection mold 20, to implement injection sealing of the power module 30 for insulation and protection.

Figure 2:
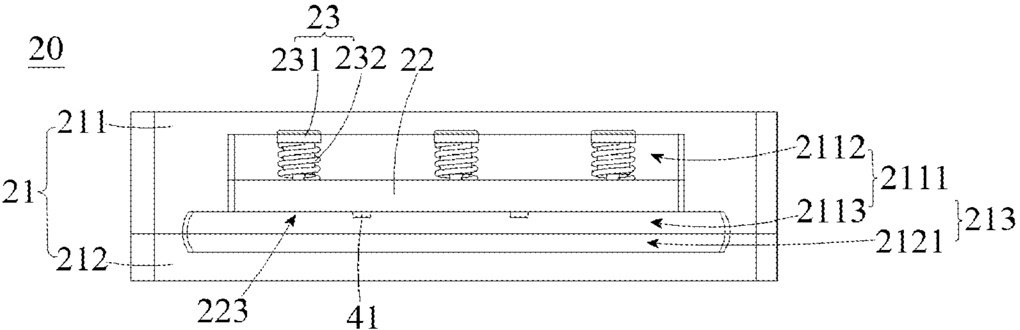
FIG. 2 is a schematic diagram of a structure of an injection mold according to an embodiment of the present disclosure.
Figure 3:
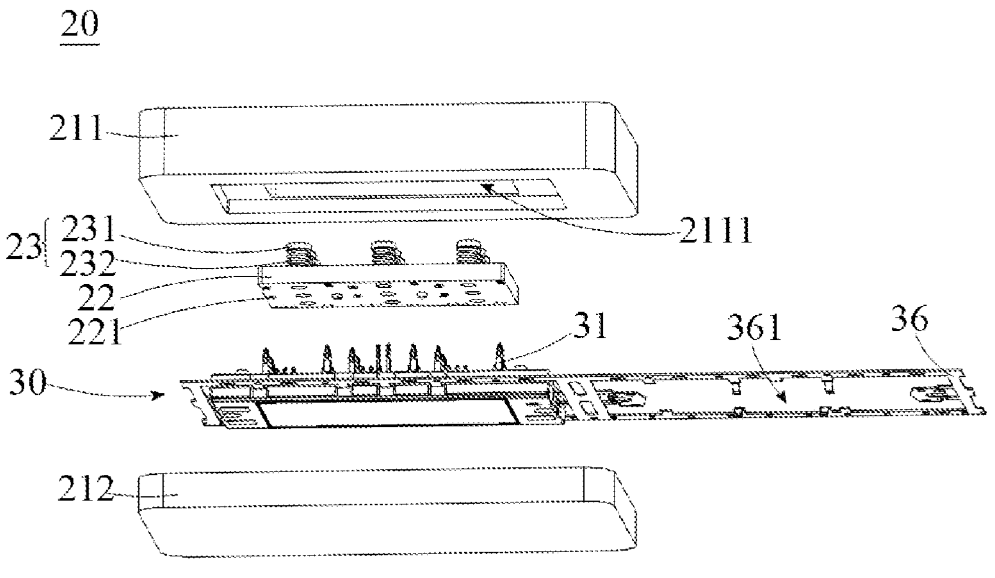
FIG. 3 is a schematic diagram of a structure of an injection mold before molding according to an embodiment of the present disclosure.
Figure 4:
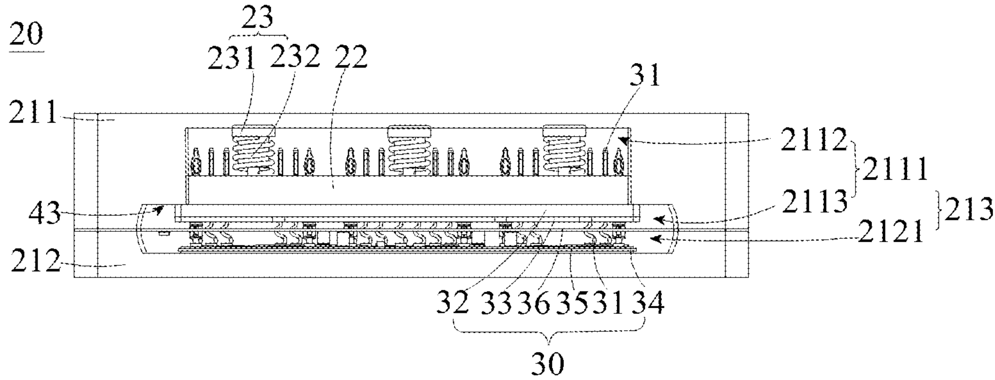
FIG. 4 is a schematic diagram of a structure of an injection mold after molding according to an embodiment of the present disclosure.

First, the present disclosure provides an injection mold. A specific structure of the injection mold is as follows:

FIG. 2 is a schematic diagram of a structure of the injection mold, FIG. 3 is a schematic diagram of a structure of the injection mold before molding (a power module is placed), and FIG. 4 is a schematic diagram of a structure of the injection mold after molding. The injection mold 20 includes a housing 21 and a cover 22. The housing 21 includes a first housing 211 and a second housing 212. The housing 21 is provided with a mold cavity 213. The first housing 211 is provided with a first cavity 2111, and the second housing 212 is provided with a second cavity 2121. The mold cavity 213 includes the first cavity 2111 and the second cavity 2121. The mold cavity 213 is configured to accommodate the power module 30. The cover 22 is provided with a plurality of vias 221. The cover 22 is detachably connected to the housing 21. The cover 22 is located in the mold cavity 213 and locates the power module 30 jointly with the housing 21. The plurality of vias 221 is configured to match a plurality of pins 31 of the power module 30.

In a possible implementation, there are at least two covers 22, each cover 22 is provided with vias 221, and arrangement manners of vias 221 on different covers 22 are different, to match a plurality of pins 31 of power modules 30 of different models. The housing 21 selectively fits with one of the plurality of covers 22 to jointly locate the power module 30. Specifically, a set of injection molds 20 may include one housing 21 (that is, one first housing 211 and one second housing 212) and at least two covers 22. It may be understood that the at least two covers 22 include a first cover and a second cover (there may be a plurality of first covers and a plurality of second covers). The first cover is provided with a plurality of first vias, and the second cover is provided with a plurality of second vias. An arrangement manner of the first vias on the first cover is different from an arrangement manner of the second vias on the second cover. Both the first cover and the second cover can be detachably connected in the mold cavity. The plurality of first vias and the plurality of second vias are configured to allow pins 31 of power modules 30 of different models to pass through.

In the present disclosure, the cover 22 is disposed, and the cover 22 is provided with the vias 221 for pins 31 to pass through. By replacing covers 22 with different arrangement manners of vias 221, a same set of injection molds 20 can be compatible with power modules 30 of a same series that have different locations of pins 31. Specifically, the first housing 211 and the second housing 212 are fastened to a device or a mold base, the power module 30 is placed in the second cavity 2121 of the second housing 212, the cover 22 fits with the power module 30 so that the pins 31 of the power module 30 pass through the vias 221, and then the first housing 211, the cover 22, the power module 30, and the second housing 212 are in a press-fit to implement injection sealing. Locations of vias 221 on different covers 22 are different. When a design of the power module 30 is changed during development or a design of the pin 31 is changed during development of a new power module of a same series, injection sealing can be implemented only through replacement with a cover 22 provided with corresponding vias 221, without replacing the entire injection mold 20, thereby improving utilization of the first housing 211 and the second housing 212, and resolving problems of a long development cycle and high costs of the injection mold 20. In addition, this can greatly reduce workload during switching between power modules of a same series in a production line, thereby improving efficiency of the production line.

The first housing 211 and the second housing 212 are snap-fitted and jointly form the housing 21 of the injection mold 20, so that the second cavity 2121 is connected to the first cavity 2111, to package the power module 30. Specifically, the first cavity 2111 in the first housing 211 includes a first sub-cavity 2112 and a second sub-cavity 2113, and the second sub-cavity 2113 is connected to the second cavity 2121, so that the first cavity 2111 and the second cavity 2121 form the mold cavity 213. A size of the second sub-cavity 2113 is greater than a size of the first sub-cavity 2112, the cover 22 is located in the first sub-cavity 2112, the power module 30 is located in the second sub-cavity 2113 and the second cavity 2121 (in other words, a part of the power module 30 is located in the second cavity 2121, and a part of the power module 30 is located in the second sub-cavity 2113), and the pins 31 of the power module 30 extend into the first sub-cavity 2112.

As shown in FIG. 4, a stepped surface is formed at a joint between the first sub-cavity 2112 and the second sub-cavity 2113 (to be distinguished from a stepped surface on the pin 31, the stepped surface herein is referred to as a first stepped surface 43), a board body 32 of the power module 30 is located in the second sub-cavity 2113, and the board body 32 is in contact with the first stepped surface 43 to prevent gel from overflowing to the first sub-cavity 2112. In an injection molding process, gel is injected into the second sub-cavity 2113 and the second cavity 2121, and the board body 32 is in contact with the first stepped surface 43 to prevent gel from overflowing to the first sub-cavity 2112 and adhering to the pins 31 extending into the first sub-cavity 2112. It may be understood that a size of the board body 32 of the power module 30 is greater than a size of the first sub-cavity 2112. In a molding process, the first housing 211 presses against the board body 32, that is, the board body 32 is in contact with the first stepped surface 43.

A size of each of the second sub-cavity 2113 and the second cavity 2121 is greater than a size of the power module 30, to accommodate the power module 30. Specific sizes and shapes of the second sub-cavity 2113 and the second cavity 2121 need to be set based on an application environment of the packaged power module 30.

It may be understood that a size and a shape of a first cavity 2111 of a same set of injection molds 20 need to be set based on locations and sizes of pins 31 of power modules of a same series.

Figure 5:
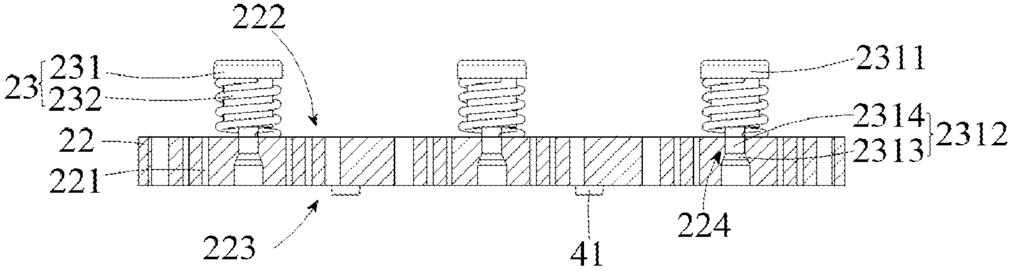
FIG. 5 is a schematic diagram of a cover and an elastic connection structure according to an embodiment of the present disclosure.

As shown in FIG. 2 and FIG. 5, an elastic connection structure 23 is disposed on the cover 22, to implement an elastic connection between the cover 22 and the housing 21. The elastic connection structure 23 includes a support rod 231 and an elastic part 232. The support rod 231 is elastically connected to the cover 22 by using the elastic part 232. The support rod 231 is in contact with an inner surface of the housing 21. Specifically, the cover 22 includes a first surface 222 and a second surface 223 that are opposite to each other, and the via 221 penetrates the first surface 222 and the second surface 223. The support rod 231 includes a first cylinder 2311 and a second cylinder 2312, the first cylinder 2311 is located on a side of the first surface 222 of the cover 22, and the second cylinder 2312 includes a limiting part 2313 and a connecting part 2314. The cover 22 is provided with a limiting hole 224. The limiting part 2313 is located in the limiting hole 224 and fits with a limiting structure in the limiting hole 224 to prevent the limiting part 2313 from moving out of the cover 22 from the side of the first surface 222. The connecting part 2314 extends out of the limiting hole 224 and is fastened to the first cylinder 2311. The elastic part 232 is sleeved on the connecting part 2314 and is elastically held between the first surface 222 and the first cylinder 2311.

One end of the elastic connection structure 23 is connected to the cover 22, and the other end of the elastic connection structure 23 is detachably connected to the inside of the housing 21. The housing 21 compresses the elastic connection structure 23, and the elastic connection structure 23 applies elastic pressure to the cover 22, so that the cover 22 and the power module 30 are in a press-fit. The elastic part 232 may be a spring or the like. The elastic connection structure 23 is not limited to the form of fitting between the support rod 231 and the elastic part 232, and may be alternatively another elastic connection structure.

Arrangement manners of vias 221 on different covers 22 are different. Locations of the vias 221 correspond to the pins 31 of the power module 30. When a design of the power module 30 is changed during development or a design of the pin 31 is changed during development of a new power module of a same series, a same set of injection molds 20 can be compatible with power modules of a same series that have different locations of pins only through replacement with a cover 22 provided with corresponding vias 221.

It may be understood that a quantity of vias 221 of each cover 22 may be greater than or equal to a quantity of pins 31 of the power module 30, and an arrangement manner of vias 221 of each cover 22 matches a plurality of pins 31 of at least one power module 30. When a quantity of vias 221 of a cover 22 is equal to a quantity of pins 31 of a matching power module 30, that is, the vias 221 are in a one-to-one correspondence with the pins 31, gel can be prevented from overflowing through excessive vias 221 in which no pins 31 are inserted. In this way, one cover 22 corresponds to one type of power module 30, and another cover 22 needs to be used when another power module 30 with different locations of pins appears. When a sealing effect between the board body 32 of the power module 30 and the first housing 211 is good and gel does not overflow to the vias 221 of the cover 22, a quantity of vias 221 of each cover 22 may be alternatively set to be greater than a quantity of pins 31 of each power module 30. In this way, a same cover 22 can be compatible with at least two power modules 30 with different locations of pins, thereby resolving problems of a long development cycle and high costs of the injection mold 20. In addition, this can greatly reduce workload during switching between power modules of a same series in a production line, thereby improving efficiency of the production line.

Figure 6A:
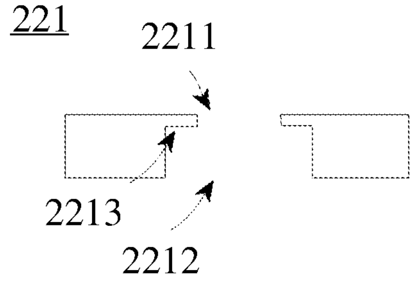
FIG. 6*a* is a schematic diagram of a structure of a via according to an embodiment of the present disclosure.
Figure 6B:
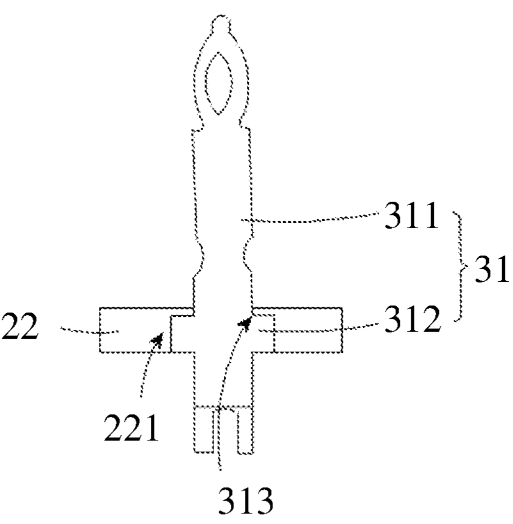
FIG. 6*b* is a schematic diagram of a structure of fitting between a via and a pin according to an embodiment of the present disclosure.

As shown in FIG. 6*a* and FIG. 6*b*, the via 221 includes a first section 2211 and a second section 2212, a limiting surface 2213 is formed between the first section 2211 and the second section 2212, the pin 31 includes a body part 311 and a fixed part 312 that protrudes from a periphery of the body part 311, a stepped surface 313 is formed at a joint between the body part 311 and the fixed part 312, the body part 311 is accommodated in the first section 2211, the fixed part 312 is accommodated in the second section 2212, and the stepped surface 313 is in contact with the limiting surface 2213 to implement a sealed connection between the cover 22 and the pin 31. The sealed connection between the cover 22 and the pin 31 can prevent injection molding gel from overflowing to the first sub-cavity 2112 through a gap between an inner wall of the via 221 and the pin 31 during injection molding.

Figure 6C:
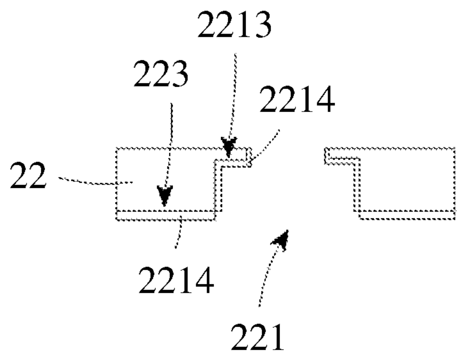
FIG. 6*c* is a schematic diagram of a structure of fitting between a via and a sealing pad according to an embodiment of the present disclosure.

It may be understood that, as shown in FIG. 6*c*, to improve a sealing effect between the cover 22 and the pin 31, a sealing pad 2214 may be disposed on the second surface 223 of the cover 22, and the sealing pad 2214 is disposed at a periphery of the via 221. The sealing pad 2214 may have an integrated structure and is fastened to the second surface 223, or the sealing pad 2214 may have a split structure, that is, a plurality of sealing pads 2214 spaced from each other is disposed on the second surface 223.

In another implementation, a sealing pad 2214 may also be disposed on the limiting surface 2213 of the via 221.

The sealing pad 2214 is disposed to prevent gel from overflowing through a gap between the via 221 and the pin 31 during injection molding.

The cover 22 is usually characterized by a small thermal expansion coefficient, high temperature resistance, and high strength. The cover 22 may be made of one or more of a titanium alloy, a copper alloy, stainless steel, and the like. A cover 22 made of a titanium alloy, a copper alloy, or stainless steel has a small thermal expansion coefficient and a light weight, thereby facilitating mounting during molding, detaching during demolding, and replacement of the cover 22. A side surface of the cover 22 (the side surface of the cover 22 is a surface, of the cover 22, that is located between the first surface 222 and the second surface 223) is attached to an inner wall of the first sub-cavity 2112, to prevent gel from overflowing to the first surface 222 through a gap between the side surface of the cover 22 and the inner wall of the first sub-cavity 2112.

Figure 7:
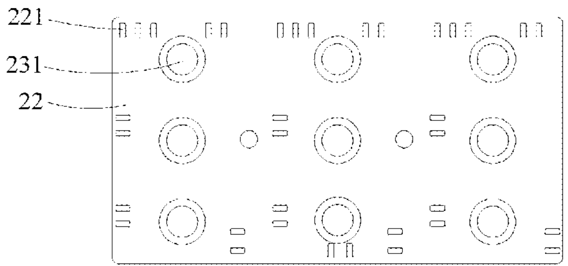
FIG. 7 is a top view of a cover and an elastic connection structure according to an embodiment of the present disclosure.

FIG. 7 is a top view of a cover assembly. There may be a plurality of support rods 231, and the plurality of support rods 231 is symmetrically and uniformly distributed on the cover 22. This can ensure that the entire cover 22 is subject to uniform pressure during compression, to press against the power module 30, and can prevent the cover 22 from being subject to a non-uniform force, which causes loose compression between the cover 22 and a part of the board body 32 of the power module 30, and causes damage to a part of the board body 32 of the power module 30 due to injection pressure.

As shown in FIG. 4, during molding, the first housing 211 is in contact with the support rod 231 and applies pressure to the support rod 231. The support rod 231 drives the elastic part 232 to be compressed (the support rod 231 has a scalable structure), so that the cover 22 is tightly attached to the board body 32 of the power module 30, and then injection molding is performed. The support rod 231 and the elastic part 232 may be integrated with the cover 22 under the condition of ensuring processing precision. The elastic part 232 is disposed, so that the cover 22 presses against the board body 32 of the power module 30, thereby preventing the board body 32 of the power module 30 from being damaged due to injection pressure.

Figure 9:
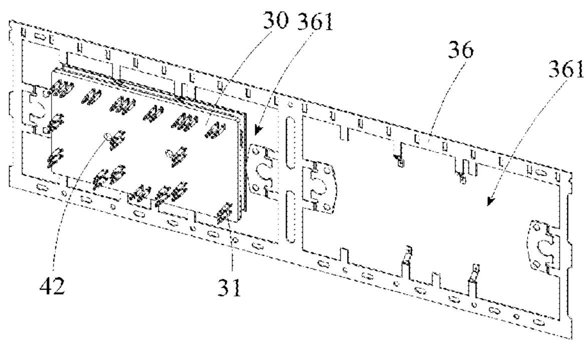
FIG. 9 is a schematic diagram of a structure of a power module according to an embodiment of the present disclosure.

As shown in FIG. 2 and FIG. 9, the cover 22 and the power module 30 are located and connected by using a limiting block and a limiting hole. Specifically, a limiting block 41 is disposed on the second surface 223 of the cover 22, the power module 30 is provided with a limiting hole 42 (to be distinguished from the limiting hole 224 on the cover 22, the limiting hole on the power module 30 is referred to as a first limiting hole 42), and the limiting block 41 is detachably inserted into the first limiting hole 42 for locating and fastening. In other words, the cover 22 and the power module 30 are located and fastened through a detachable connection by using the limiting block 41 and the first limiting hole 42.

Figure 8:
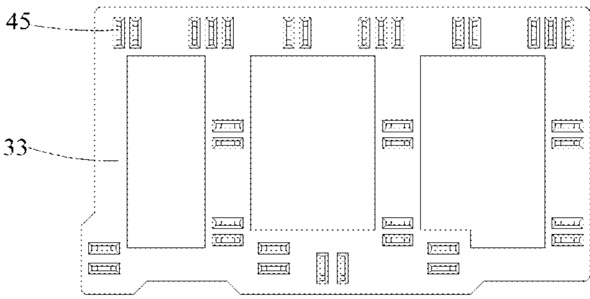
FIG. 8 is a schematic diagram of a structure of a silicone pad according to an embodiment of the present disclosure.

As shown in FIG. 4, FIG. 8, and FIG. 9, the power module 30 includes a pin 31, a board body 32, a silicone pad 33, a circuit board 34, an electronic element 35, and a support 36. The electronic element 35 is located on the circuit board 34. One end of the pin 31 is fastened to the circuit board 34, and the other end of the pin 31 sequentially passes through a via on the silicone pad 33 and a via on the board body 32 (to distinguish from the via 221 on the cover 22, the via on the silicone pad 33 and the via on the board body 32 are referred to as a first via 45). After mounting is completed, the pin 31, the board body 32, the silicone pad 33, the circuit board 34, and the electronic element 35 are fastened to a mounting area 361 of the support 36. The silicone pad 33 may have an integrated structure or a split structure. This is not limited in the present disclosure.

The pin 31 extends into the first sub-cavity 2112 through the via 221. The first sub-cavity 2112 has a hollowed-out structure, thereby facilitating cleaning when gel overflows (specifically, when gel overflows to the first sub-cavity 2112 and adheres to an inner wall of the first sub-cavity 2112, the first housing 211 may be separated from the second housing 212, and the hollowed-out first sub-cavity 2112 is separately cleaned). A specific structure of the pin 31 includes but is not limited to a cylindrical pin, a regular polygonal pin, a flat pin, and an irregular pin. This is not limited in the present disclosure, and may be arranged based on a specific application environment. A quantity and location distribution of pins 31 need to be set based on a specific application environment. This is not limited in the present disclosure.

In a molding process, the silicone pad 33 is pressed and deformed to provide a supporting force for the cover 22, and perform sealing with the pin 31, to provide good sealing performance, and prevent gel from overflowing to the first sub-cavity 2112 through a gap between the pin 31 and the first via on the board body 32. The silicone pad 33 may be a silicone pad with low hardness, for example, may be made of a soft silicone material, or may be made of another sealing material such as a rubber pad. This is not limited in the present disclosure.

The circuit board 34 includes but is not limited to an aluminum-based resin copper clad board, a copper-based resin copper clad board, or a double-sided copper clad ceramic board, and the electronic element 35 with an inversion, rectification, braking, or buffering function is welded on the circuit board 34.

The support 36 is bonded to an edge of the second housing 212, to limit a location of the power module 30 in the second cavity 2121. It may be understood that the power module 30 may be alternatively located by using another structure. For example, a locating part is disposed on the circuit board 34 of the power module 30, the second housing 212 is provided with a locating hole, and the locating part is embedded into the locating hole to locate the power module 30 on the second housing 212.

As shown in FIG. 9, a plurality of mounting areas 361 may be provided on the support 36 at intervals (the mounting areas 361 are hollow areas on the support 36, and power modules 30 are fastened to the mounting areas 361). FIG. 9 merely shows two mounting areas 361 as an example. There may be alternatively three, four, five, or more mounting areas on each support 36. This is not limited in the present disclosure. In other words, a plurality of power modules 30 may be disposed on each support 36 at intervals. In a molding process, one injection mold 20 corresponds to one power module 30. In this way, injection sealing can be simultaneously performed on a plurality of power modules 30, thereby improving packaging efficiency of a production line.

Figure 10:
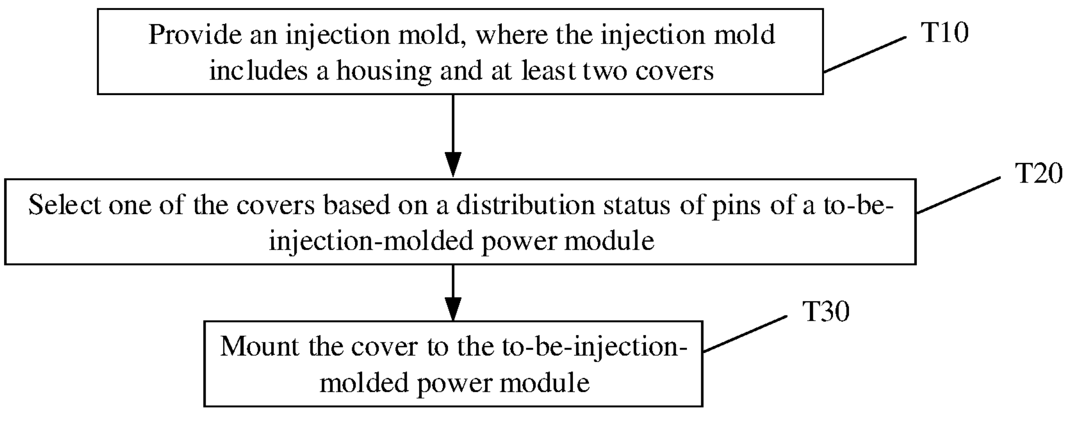
FIG. 10 is a flowchart of an injection molding method according to an embodiment of the present disclosure.

Further, the present disclosure provides an injection molding method. As shown in FIG. 10, in an implementation, the injection molding method includes the following steps.

T10: Provide an injection mold 20, where the injection mold 20 includes a housing 21 and at least two covers 22.

As shown in FIG. 2 and FIG. 5, the housing 21 is provided with a mold cavity 213, each cover 22 is provided with a plurality of vias 221, and arrangement manners of vias 221 on different covers 22 are different.

T20: Select one of the covers 22 based on a distribution status of pins 31 of a to-be-injection-molded power module 30.

It may be understood that an arrangement manner of vias 221 on the cover 22 matches an arrangement manner of the pins 31 of the power module 30.

T30: Mount the cover 22 to the to-be-injection-molded power module.

Specifically, first, the to-be-injection-molded power module is placed in the mold cavity 213, and when the cover 22 is mounted to the to-be-injection-molded power module, the pins 31 pass through the vias 221.

After the cover 22 is mounted, a first housing 211 and a second housing 212 are connected to form the housing 21. The housing 21 surrounds the cover 22 and the power module 30. A gel injection opening is provided on the housing 21, and is used for injecting gel (the gel may be silicone, silicon gel, resin, or the like) into a second sub-cavity 2113 and a second cavity 2121, so that the gel overflows and fills internal space of the second sub-cavity 2113 and the second cavity 2121, and the gel is cured and molded, to completely seal the power module 30 through injection molding, and provide insulation protection and dust prevention for the power module 30. In a demolding process, the first housing 211 is separated from the second housing 212, and a support rod 231 and an elastic part 232 are restored to an uncompressed state, so that the cover 22 and the injection-molded power module 30 can be taken out.

In the present disclosure, a general-purpose injection mold 20 that can be flexibly replaced is designed. The injection mold 20 includes a housing 21 and a replaceable cover 22. A same set of injection molds 20 can be compatible with power modules of a same series that have different locations of pins 31 only by replacing the cover 22. This reduces costs of replacing the injection mold 20, and improves efficiency of a production line. The injection mold 20 in the present disclosure is applicable to power modules with a same outline size but different locations of pins 31, thereby avoiding a problem that a new injection mold 20 needs to be developed with high costs and a long cycle when a new power module of a same series is developed. The injection mold has advantages of a simple structure, easy operations, and high reliability and universality.

The foregoing descriptions are merely optional implementations of the present disclosure. It should be noted that a person of ordinary skill in the art may make several improvements or polishing without departing from the principle of the present disclosure and the improvements or polishing shall fall within the protection scope of the present disclosure.

What is claimed is:

1. An injection mold, comprising a housing and a cover, wherein the housing is provided with a mold cavity, and the mold cavity is configured to accommodate a power module; and the cover is provided with a plurality of vias, the cover is detachably connected to the housing, the cover is located in the mold cavity and locates the power module jointly with the housing, and the plurality of vias is configured to match a plurality of pins of the power module, wherein the injection mold further comprises an elastic connection structure connected to the cover, to implement an elastic connection between the cover and the housing, and wherein the elastic connection structure comprises a support rod and an elastic part, the support rod is elastically connected to the cover by using the elastic part, and the support rod is in contact with an inner surface of the housing.

2. The injection mold according to claim 1, wherein the cover comprises a first surface and a second surface that are opposite to each other, each of the plurality of vias penetrates the first surface and the second surface, the support rod comprises a first cylinder and a second cylinder, the first cylinder is located on a side of the first surface of the cover, the second cylinder comprises a limiting part and a connecting part, the cover is provided with a limiting hole, the limiting part is located in the limiting hole and fits with a limiting structure in the limiting hole to prevent the limiting part from moving out of the cover from the side of the first surface, the connecting part extends out of the limiting hole and is fastened to the first cylinder, and the elastic part is sleeved on the connecting part and is elastically held between the first surface and the first cylinder.

3. The injection mold according to claim 1, wherein the housing comprises a first housing and a second housing, the first housing is provided with a first cavity, the first cavity comprises a first sub-cavity and a second sub-cavity, a stepped surface is formed at a joint between the first sub-cavity and the second sub-cavity, the second housing comprises a second cavity, the first housing and the second housing are snap-fitted so that the second cavity is connected to the first cavity, the cover is located in the first sub-cavity, a part of the power module is located in the second cavity, and a part of the power module is located in the second sub-cavity and is in contact with the stepped surface.

4. The injection mold according to claim 1, wherein a quantity of vias of the cover is greater than or equal to a quantity of pins of the power module, and an arrangement manner of vias of the cover matches a plurality of pins of at least one power module.

5. The injection mold according to claim 1, wherein each of the plurality of vias comprises a first section and a second section, a limiting surface is formed between the first section and the second section, the first section is configured to accommodate a body part of one of the plurality of pins, the second section is configured to accommodate a fixed part that protrudes from a periphery of the body part, and the limiting surface is in contact with a stepped surface formed at a joint between the body part and the fixed part to implement a sealed connection between the cover and the pin.

6. The injection mold according to claim 5, wherein the cover comprises a first surface and a second surface that are opposite to each other; and for each of the plurality of vias, the respective via penetrates the first surface and the second surface, a sealing pad is disposed on the second surface, and the sealing pad is disposed at a periphery of the respective via, and/or the sealing pad is disposed on the limiting surface of the respective via.

7. The injection mold according to claim 1, wherein the cover comprises a first surface and a second surface that are opposite to each other, each of the plurality of vias penetrates the first surface and the second surface, a limiting block is disposed on the second surface of the cover, and the limiting block is embedded into a limiting hole on the power module to limit locations of the cover and the power module.

8. An injection molding method, comprising:

providing an injection mold, wherein the injection mold comprises a housing and at least two covers and an elastic connection structure, the housing is provided with a mold cavity, each of the at least two covers is provided with a plurality of vias, arrangement manners of the plurality of vias on different covers are different, and the elastic connection structure is connected to each of the at least two covers, to implement an elastic connection between each of the at least two covers and the housing;

selecting one of the covers as a selected cover based on a distribution status of pins of a to-be-injection-molded power module, wherein an arrangement manner of the plurality of vias on the selected cover matches an arrangement manner of the pins of the to-be-injection-molded power module;

placing the to-be-injection-molded power module in the mold cavity; and mounting the selected cover to the to-be-injection-molded power module, so that the pins pass through the plurality of vias, wherein the elastic connection structure comprises a support rod and an elastic part, the support rod is elastically connected to the at least two covers by using the elastic part, and the support rod is in contact with an inner surface of the housing.

9. An injection mold, comprising:

a housing, provided with a mold cavity, wherein the mold cavity is configured to accommodate a power module; and at least two covers, wherein each of the at least two covers is provided with a plurality of vias, and arrangement manners of the plurality of vias on different covers are different, to match a plurality of pins of power modules of different models, wherein the housing selectively fits with one of the at least two covers to jointly locate the power module, wherein the injection mold further comprises an elastic connection structure connected to each of the at least two covers, to implement an elastic connection between each of the at least two covers and the housing, and wherein the elastic connection structure comprises a support rod and an elastic part, the support rod is elastically connected to the at least two covers by using the elastic part, and the support rod is in contact with an inner surface of the housing.

10. The injection mold according to claim 9, wherein, for each of the at least two covers: the respective cover comprises a first surface and a second surface that are opposite to each other, at least one of the plurality of vias penetrates the first surface and the second surface of the respective cover, the support rod comprises a first cylinder and a second cylinder, the first cylinder is located on a side of the first surface of the respective cover, the second cylinder comprises a limiting part and a connecting part, the respective cover is provided with a limiting hole, the limiting part is located in the limiting hole and fits with a limiting structure in the limiting hole to prevent the limiting part from moving out of the respective cover from the side of the first surface, the connecting part extends out of the limiting hole and is fastened to the first cylinder, and the elastic part is sleeved on the connecting part and is elastically held between the first surface and the first cylinder.

11. The injection mold according to claim 9, wherein the housing comprises a first housing and a second housing, the first housing is provided with a first cavity, the first cavity comprises a first sub-cavity and a second sub-cavity, a stepped surface is formed at a joint between the first sub-cavity and the second sub-cavity, the second housing comprises a second cavity, the first housing and the second housing are snap-fitted so that the second cavity is connected to the first cavity, each of the at least two covers is located in the first sub-cavity, a part of the power module is located in the second cavity, and a part of the power module is located in the second sub-cavity and is in contact with the stepped surface.

12. The injection mold according to claim 9, wherein a quantity of vias of each of the at least two covers is greater than or equal to a quantity of pins of the power module, and an arrangement manner of vias of each of the two covers matches a plurality of pins of at least one power module.

13. The injection mold according to claim 9, wherein each of the plurality of vias comprises a first section and a second section, a limiting surface is formed between the first section and the second section, the first section is configured to accommodate a body part of one of the plurality of pins, the second section is configured to accommodate a fixed part that protrudes from a periphery of the body part, and the limiting surface is in contact with a stepped surface formed at a joint between the body part and the fixed part to implement a sealed connection between one of the at least two covers and the pin.

14. The injection mold according to claim 13, wherein, for each of the at least two covers: the respective cover comprises a first surface and a second surface that are opposite to each other, at least one of the plurality of vias penetrates the first surface and the second surface of the respective cover, a sealing pad is disposed on the second surface, and the sealing pad is disposed at a periphery of the at least one of the plurality of vias, and/or the sealing pad is disposed on the limiting surface of the at least one plurality of vias.

15. The injection mold according to claim 9, wherein, for each of the at least two covers: the respective cover comprises a first surface and a second surface that are opposite to each other, at least one of the plurality of vias penetrates the first surface and the second surface of the respective cover, a limiting block is disposed on the second surface of the respective cover, and the limiting block is embedded into a limiting hole on the power module to limit locations of the respective cover and the power module.

* * * * *